(12) United States Patent
Jeong et al.

(10) Patent No.: US 8,661,360 B2
(45) Date of Patent: Feb. 25, 2014

(54) APPARATUS AND METHOD FOR SWITCHING BETWEEN VIRTUAL MACHINES

(75) Inventors: Bok-Deuk Jeong, Yongin-si (KR); Sang-Dok Mo, Hwaseong-si (KR); Sung-Min Lee, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 12/856,858

(22) Filed: Aug. 16, 2010

(65) Prior Publication Data
US 2011/0126139 A1    May 26, 2011

(30) Foreign Application Priority Data

Nov. 23, 2009  (KR) ......................... 10-2009-0113324

(51) Int. Cl.
*G06F 3/00* (2006.01)
*G06F 3/048* (2013.01)

(52) U.S. Cl.
USPC ........... 715/767; 715/751; 715/778; 715/769; 715/748; 715/733

(58) Field of Classification Search
USPC .................. 715/751, 778, 769, 748, 733
See application file for complete search history.

(56) References Cited

U.S. PATENT DOCUMENTS

| | | | | |
|---|---|---|---|---|
| 7,370,324 | B2 * | 5/2008 | Goud et al. | 718/1 |
| 7,894,918 | B2 * | 2/2011 | Kanodia et al. | 700/17 |
| 2006/0139360 | A1 | 6/2006 | Panesar et al. | |
| 2006/0146057 | A1 | 7/2006 | Blythe | |
| 2007/0162901 | A1 | 7/2007 | Oh | |
| 2007/0266136 | A1 * | 11/2007 | Esfahany et al. | 709/223 |
| 2008/0088636 | A1 * | 4/2008 | Ho | 345/530 |
| 2009/0070781 | A1 * | 3/2009 | Fitzgerald et al. | 719/316 |
| 2009/0193245 | A1 * | 7/2009 | Isaacson | 713/2 |
| 2009/0217267 | A1 * | 8/2009 | Gebhart et al. | 718/100 |
| 2009/0248847 | A1 * | 10/2009 | Sutoh et al. | 709/223 |
| 2010/0198972 | A1 * | 8/2010 | Umbehocker | 709/226 |

FOREIGN PATENT DOCUMENTS

| | | |
|---|---|---|
| KR | 10-2006-0079088 | 7/2006 |
| KR | 10-2007-0075162 | 7/2007 |
| KR | 10-2008-0076304 | 8/2008 |
| KR | 10-2009-0007494 | 1/2009 |

* cited by examiner

*Primary Examiner* — David Phantana Angkool
(74) *Attorney, Agent, or Firm* — NSIP Law

(57) ABSTRACT

An apparatus and method for switching a VM screen in an environment in which a plurality of OSs operating on a virtual machine monitor (VMM), are provided. The VM screen switching apparatus provides VM screen switching so that features of a home screen or an operation screen provided by each VM can be shown. The VM screen switching apparatus provides a user interface for enabling a user to select a desired VM from a plurality of VMs. The apparatus determines a VM to be displayed as a foreground according to a user input signal, and combines graphic data of a currently displayed screen of a VM with graphic data for a screen of the determined VM to create a screen displaying VM screen switching, and outputs the created screen to a display device.

20 Claims, 17 Drawing Sheets

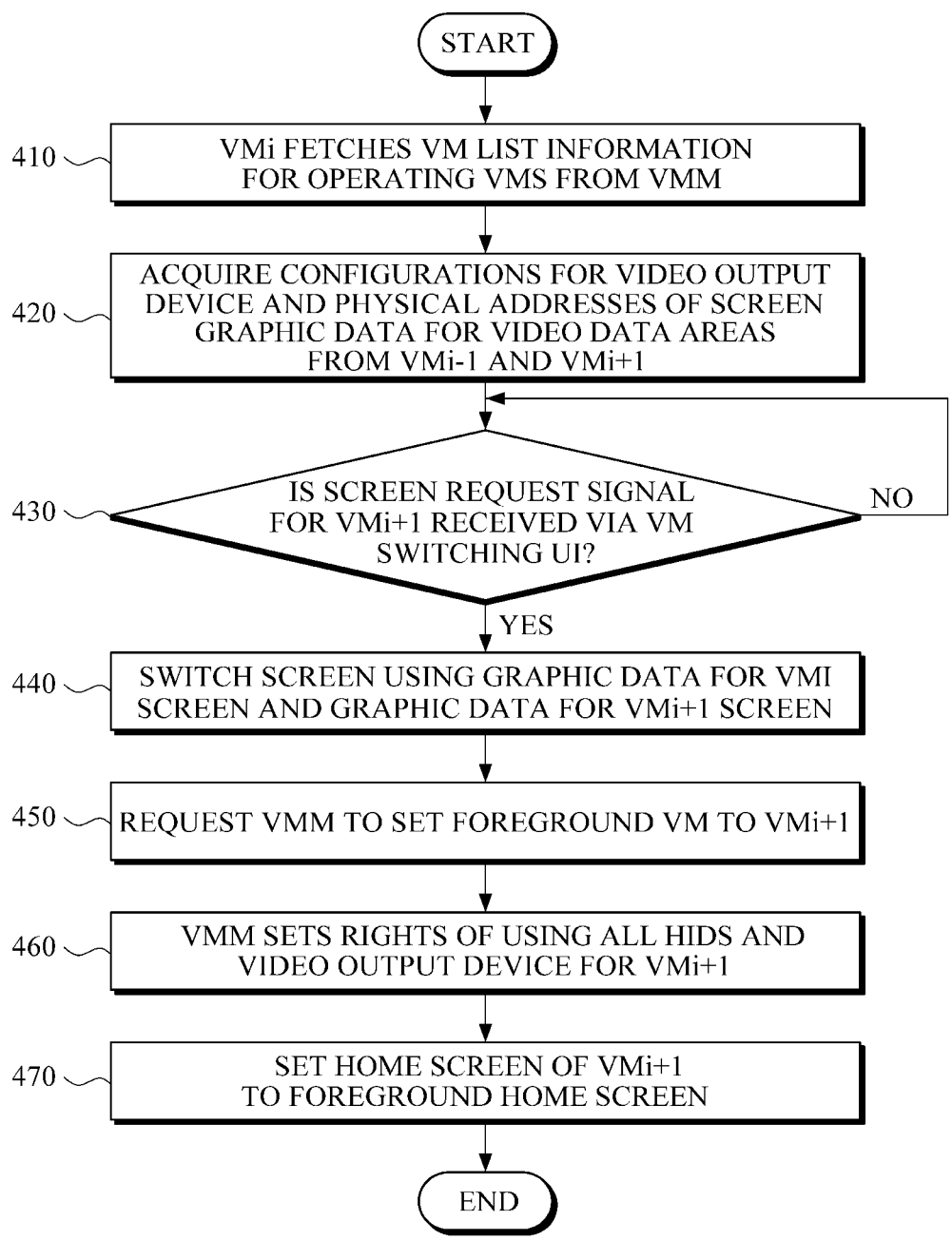

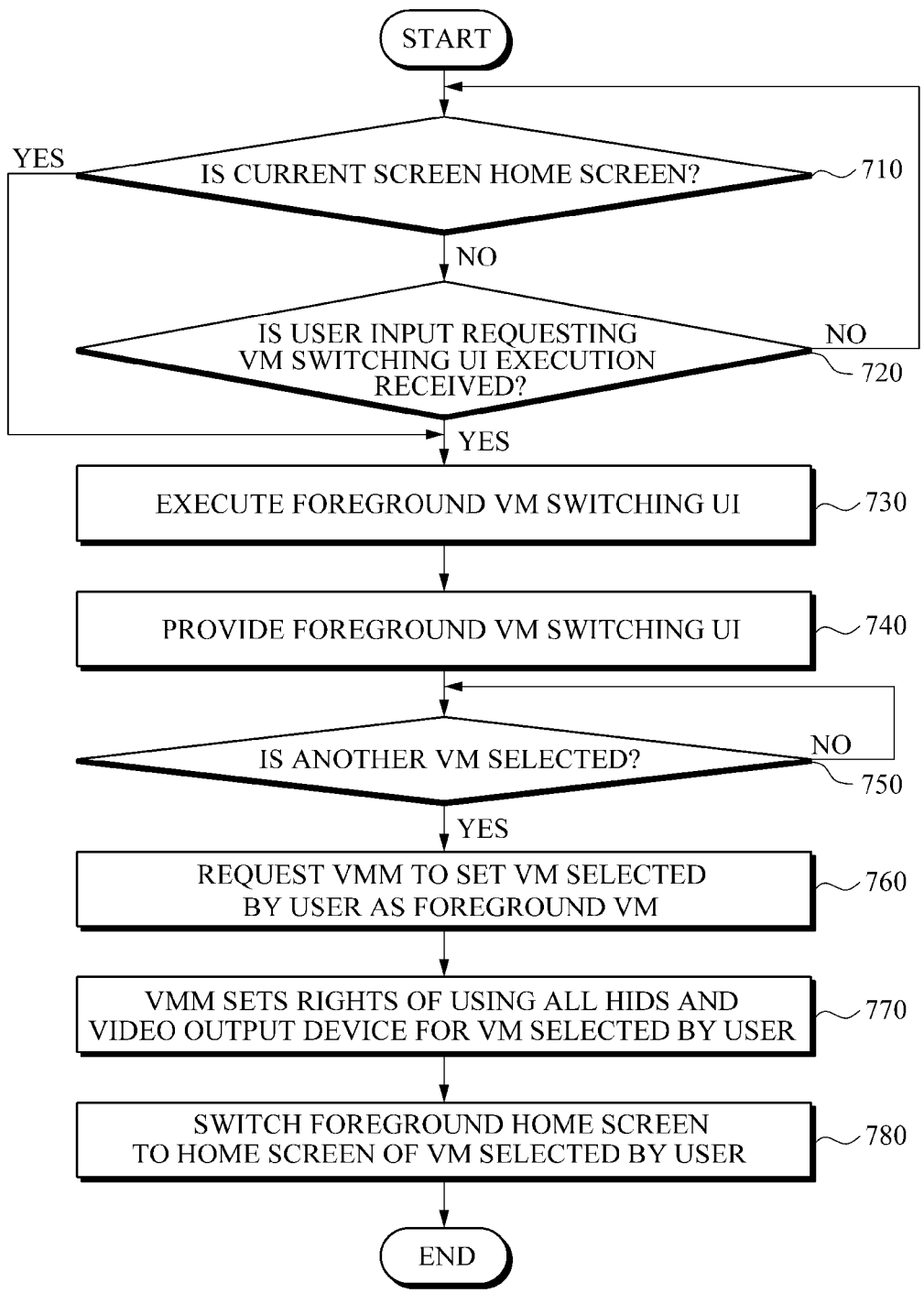

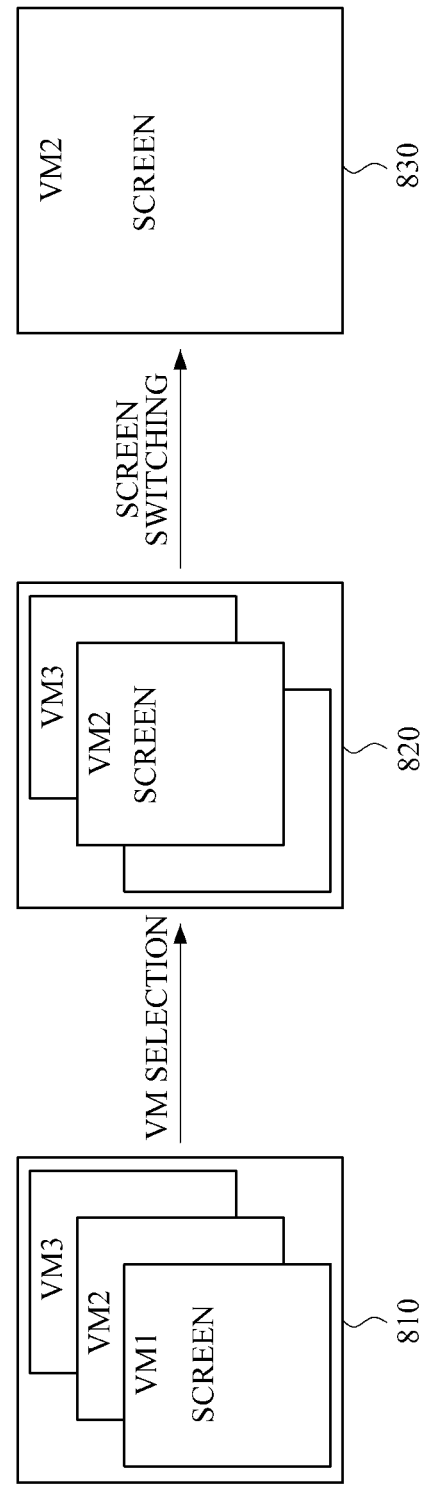

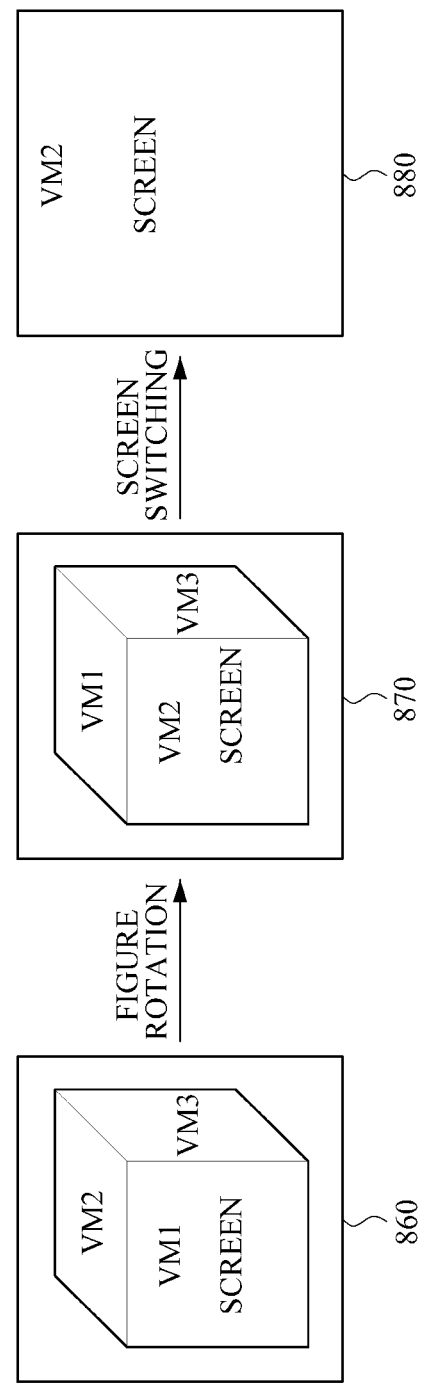

APPARATUS AND METHOD FOR SWITCHING BETWEEN VIRTUAL MACHINES

CROSS REFERENCE TO RELATED APPLICATION(S)

This application claims the benefit under 35 U.S.C. §119 (a) of a Korean Patent Application No. 10-2009-0113324, filed on Nov. 23, 2009, in the Korean Intellectual Property Office, the entire disclosure of which is incorporated herein by reference for all purposes.

BACKGROUND

1. Field

The following description relates to system virtualization technology, and more particularly, to a switching technology in an environment in which a plurality of operating systems operate on a virtual machine monitor (VMM).

2. Description of the Related Art

Virtualization technology allows for the efficient use of resources by logically integrating physically distributed systems or by logically dividing one system. For example, hypervisor virtualization for operating system virtualization supports a plurality of operating systems using a hypervisor or a virtual machine monitor disposed logically between a virtual machine and hardware.

The hypervisor virtualization may be classified into full-virtualization which refers to the complete virtualization of hardware and para-virtualization which refers to the partial virtualization of hardware. A VMW may support the full-virtualization and may display the execution of applications of other virtual machines through an application of a virtual machine operating as a foreground. XEN® hypervisor may support the para-virtualization and may use a method in which a user inputs a command to select a virtual machine operating as an OS that the user desires to switch the screen to. A user may also input commands to determine a predetermined order among a plurality of virtual machines to which to switch.

However, a user must know a screen switching command when inputting the screen switching command in order to switch to an operation screen of another virtual machine, as in the case of XEN. Currently, only a simple user interface using a specific application has been provided. The XEN, VMware, and the like, used as an application for displaying a screen of another virtual machine on a current virtual machine are not suitable for consumer electronics (CE) devices that have a relatively smaller-sized screen and a lower computing power than a personal computer or a server.

SUMMARY

In one general aspect, there is provided a virtual machine (VM) screen switching apparatus, including: a virtual machine monitor, and a plurality of VMs, each VM including: a VM switching user interface provider configured to provide a user interface for enabling a user to select a next VM from the plurality of VMs, and configured to determine to display the next VM as a foreground, according to a user input signal, a VM screen renderer configured to: combine graphic data of a current VM being displayed as the foreground with graphic data of the next VM to be displayed, and create a screen displaying VM screen switching including the combined graphic data, and an output device driver configured to output the created screen to a display device.

The apparatus may further include that: the each VM further includes a storing unit configured to store graphic data of VM screens of the plurality of VMs, and the VM screen renderer is further configured to obtain a physical address of the storing unit at which the graphic data of the screen of the next VM is stored through communication between the output device driver and an output device driver of the determined VM.

The apparatus may further include that the user input signal includes at least one of: a voice input, an input from a sensor sensing the tilt of the VM screen switching apparatus, an input from a sensor sensing the wave of the VM screen switching apparatus, a mouse input, and a touch screen input.

The apparatus may further include that the VM screen includes a home screen including information on a plurality of applications executable by the VM.

The apparatus may further include that the virtual machine monitor is further configured to: manage a list of at least one operating VM, and provide an updated list to the VM switching user interface provider when the list is updated.

The apparatus may further include that the virtual machine monitor is further configured to adjust a setting so that the next VM determined according to the user input signal has a right to access a user input device for receiving the user input signal and the display device.

The apparatus may further include that each of the plurality of VMs is configured to operate in a virtual window system mode in which a plurality of applications operating in the plurality of VMs are integrated and provided without discriminating the plurality of VMs.

In another general aspect, there is provided a VM screen switching apparatus, including: a virtual machine monitor, and a plurality of VMs, each VM including: a VM switching user interface provider configured to: graphically display a list of VMs operating on the virtual machine monitor, and provide a user interface that enables a user to select a specific VM, and a video output device driver configured to output the user interface to a display device.

The apparatus may further include that the each of the VMs further includes a VM switching UI loader configured to: recognize a user input signal requesting a user interface while a general application is operating, and control the VM switching user interface provider to provide the user interface.

The apparatus may further include that the VM switching user interface provider is further configured to provide the user interface in a pop-up form.

The apparatus may further include that the VM switching user interface provider is further configured to provide the user interface in a Widget form from which the operating VMs may be selected.

The apparatus may further include that: the virtual machine monitor is further configured to switch the selected VM to a foreground VM according to a user input signal to select the specific VM from the plurality of VMs, the user input signal being provided via the user interface, and an output device driver included in the switched VM is configured to output an operation screen of the switched VM to the display device.

The apparatus may further include that: the virtual machine monitor is further configured to manage a list of at least one operating VM, and in response to the list of at least one operating VM being updated, the virtual machine monitor is further configured to provide the updated list to the VM switching user interface provider.

The apparatus may further include that each of the plurality of VMs is configured to operate in a virtual window system mode in which a plurality of applications operating in the plurality of VMs are integrated and provided without discriminating the plurality of VMs.

In another general aspect, there is provided a VM screen switching apparatus, including: a virtual machine monitor, and a plurality of VMs including: a client VM configured to receive a request to provide a user interface, and a server VM configured to: combine graphic data for the plurality of VMs operating on the virtual machine monitor, graphically display the graphic data, and provide a user interface configured to enable a user to select a specific VM from the plurality of VMs, in response to the request to provide a user interface.

The apparatus may further include that the server VM includes: a VM switching user interface provider configured to: graphically display the graphic data for the VMs operating on the virtual machine monitor, and to provide the user interface, a VM switching UI loader configured to: recognize the request to provide a user interface, and to control the VM switching user interface provider to provide the user interface, and a video output device driver configured to output the user interface to a display device, wherein the client VM includes a VM switching recognizer configured to recognize whether the user requests to execute a VM switching user interface when the client VM is operating as a foreground.

The apparatus may further include that the server VM further includes a VM screen renderer configured to create a screen displaying VM screen switching according to a user input signal input via the user interface.

The apparatus may further include that the VM switching user interface provider is further configured to control the VM screen renderer such that the user interface displays graphic data for screens of the plurality of VMs in one of: an overlapped form, a grid form, and a three-dimensional figure form.

The apparatus may further include that each of the plurality of VMs is configured to operate in a virtual window system mode in which a plurality of applications operating in the plurality of VMs are integrated and provided without discriminating the plurality of VMs.

In another general aspect, there is provided a VM screen switching method, including: receiving a signal requesting a VM switching user interface, and upon receipt of the signal, providing the VM switching user interface to enable a user to select a screen of a desired VM from a plurality of VMs operating on a virtual machine monitor.

Other features and aspects may be apparent from the following detailed description, the drawings, and the claims.

BRIEF DESCRIPTION OF THE DRAWINGS

FIG. 4 is a flowchart illustrating an example of a VM screen switching method.

FIG. 7 is a flowchart illustrating another example of a VM screen switching method of 5A and 5B.

FIGS. 8A through 8C are diagrams illustrating another example of a VM screen switching user interface.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

As described herein, an apparatus for switching the screen between virtual machines (hereinafter, referred to as VMs) is based on a device that is capable of supporting a plurality of VMs using a virtual machine monitor. The VM screen switching apparatus provides a VM switching user interface for enabling a user to select a desired VM out of a plurality of VMs operating on the virtual machine monitor. The VM switching apparatus may be, or may be included in a terminal such as a computer or a mobile terminal.

The virtual machine monitor supports an environment in which a plurality of operating systems can be executed on a hardware device. The hardware may include a processor, a memory, a human interface device (HID), a video output device, an audio output device, and the like. In this example, the HID refers to a user interface device for receiving an input from a user and providing an output to the user for direct interaction with the user. HIDs may include a keyboard, a mouse, a trackball, a touch pad, a graphic tablet, a joystick, and the like. The virtual machine monitor may provide an inter-domain communication (IDC) channel as a safe communication channel between a plurality of operating systems operating on the virtual machine monitor.

Figure 1:
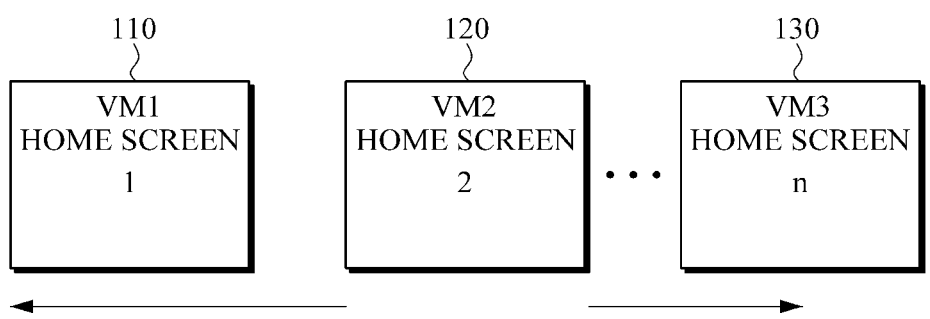
FIG. 1 is a diagram illustrating an example of a VM screen switching user interface.

FIG. 1 illustrates an example of a VM screen switching user interface.

Referring to FIG. 1, VM home screens 110, 120, and 130 of a VM screen switching user interface may be arranged horizontally and may be selected by a user. As shown in FIG. 1, the VM screen switching user interface may provide the home screens of the VMs in a continuous manner. The home screen may include information on available applications, for example, an application execution icon. Accordingly, the user interface as shown in FIG. 1 may increase access capability of a user to applications in each of the VMs.

A variety of user input schemes may be displayed on a home screen of a VM currently displayed as a foreground, and the input schemes may be used to switch to a home screen of another VM.

For example, a user may input a screen switching command using the user interface to switch the screen, for example, by clicking a displayed home screen using a mouse and then dragging the home screen to [right or left]/[up or down], or dragging or sliding a screen to the [right or left]/[up or down] or using a stylus or finger in the case of a touch screen.

For example, when the VM screen switching apparatus has a location sensor or a direction sensor, the user may input a screen switching command to the user interface to switch the screen by tilting the screen of the VM screen switching apparatus to the [right or left]/[up or down].

Alternatively, the user may input a screen switching command to switch the screen by waving the VM screen switching apparatus. For example, when a first screen switching command is performed by waving the VM screen switching apparatus, the screen may be sequentially switched between a home screen of a first VM to a home screen of the last VM. Subsequently, when the home screen of the last VM is provided, the user may perform a second switching command by waving the VM screen switching apparatus, and the screen may be returned to the home screen of the first VM.

In some embodiments, the VM screen switching apparatus may support speech recognition, and the screen may be switched between the VMs by vocal commands, for example, when the user says "go to next VM"/"go to previous VM" or "go to next OS"/"go to previous OS."

Screen switching effects as shown in FIGS. 2A through 2D may be provided using graphic data of a home screen of a VM currently displayed and a screen of a VM to be moved to. For example, a current VM may be displayed as a foreground and graphic data of a home screen of a VM to be moved to may also be displayed as the foreground for a screen switching effect.

FIGS. 2A through 2D illustrate examples of a screen switching effect for a VM screen switching interface.

Figure 2A:
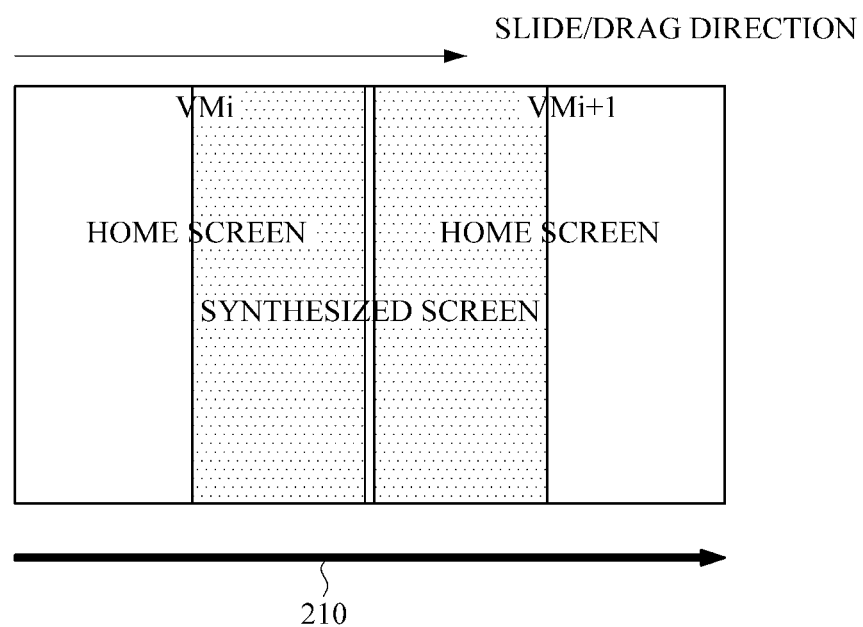
FIGS. 2A through 2D are diagrams illustrating examples of a screen switching effect for a VM screen switching user interface.

Referring to FIG. 2A, when the user moves the screen with an input command, for example, when the user drags/slides to the right, tilts the device, waves the device, or says "go to next VM"/"go to next OS", the VM screen switching apparatus may combine graphic data for a home screen of $VM_{i+1}$ currently displayed as a foreground with graphic data for a home screen of a next $VM_i$ to create a synthesized screen. The VM screen switching apparatus may horizontally connect the two screens using the synthesized screen to provide a sliding window effect in a direction 210. In this example, the sliding window effect is towards the right, but it should be appreciated that the window may be slid in the left direction according to a user input.

Figure 2B:
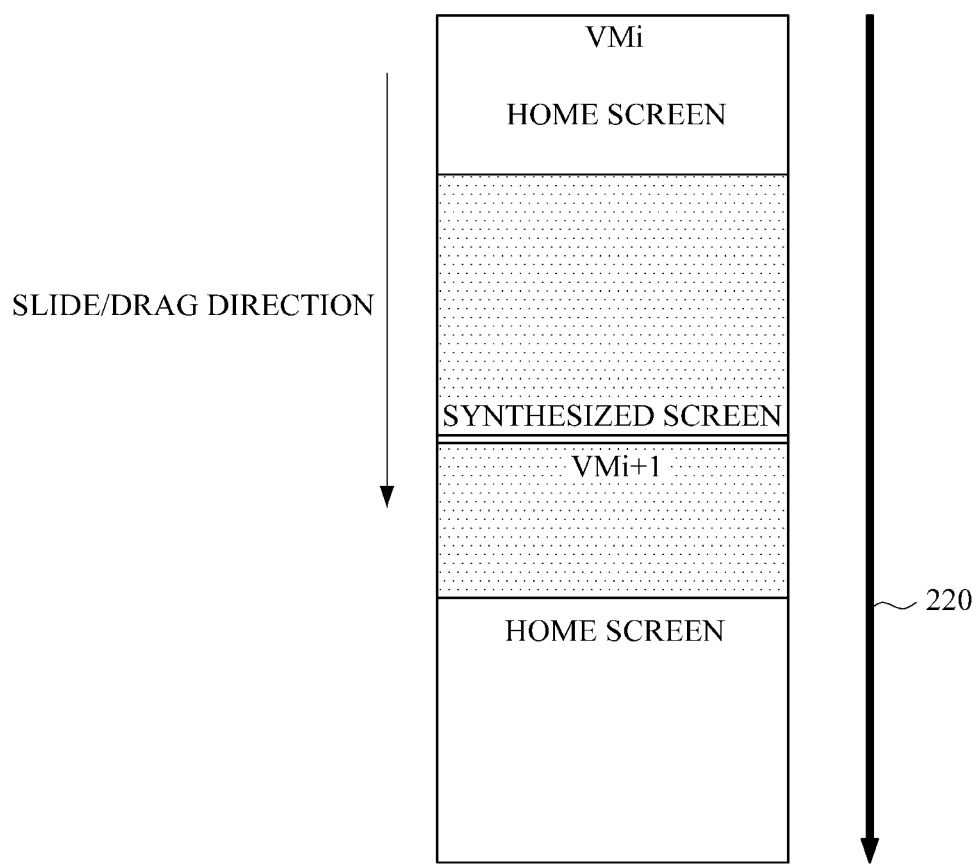

As shown in FIG. 2B, when the user commands the screen downward, the VM screen switching apparatus may combine graphic data for a home screen of $VM_{i+1}$ currently displayed as a foreground with graphic data for a home screen of $VM_i$ to create a synthesized screen. The VM screen switching apparatus may vertically connect the two screens using the synthesized screen to create a sliding window effect in a down direction 220.

Figure 2C:
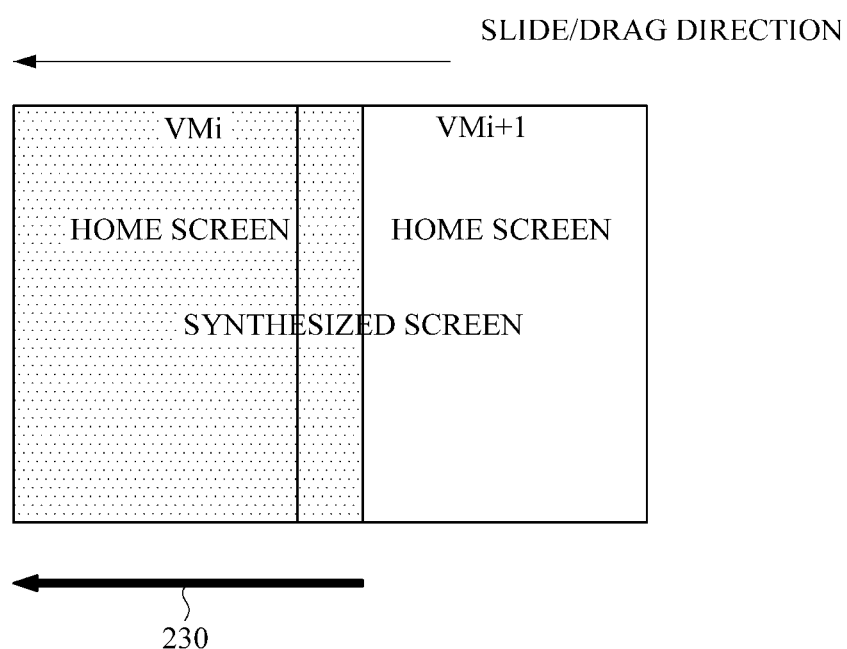
Figure 2D:
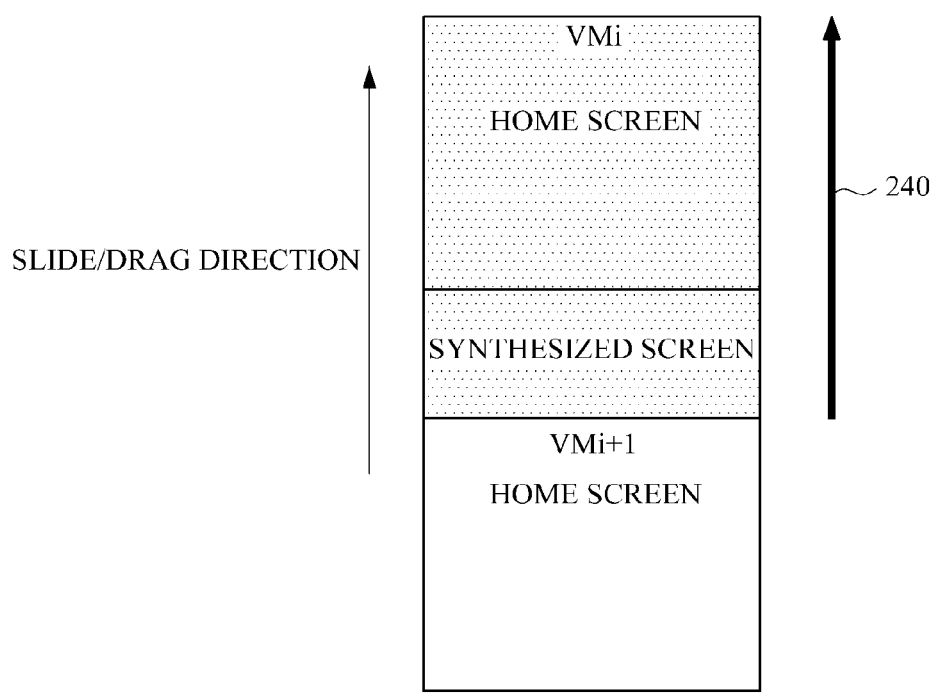

As shown in FIG. 2C, when the user commands the screen left, the VM screen switching apparatus may combine graphic data for a home screen of $VM_i$ currently displayed as a foreground with graphic data for a home screen of a next $VM_{i+1}$ to create a synthesized screen. The VM screen switching apparatus may provide a gradually covering effect of the home screen of $VM_i$ with the home screen of $VM_{i+1}$ from the right to the left as indicated by 230 using the synthesized screen. As shown in FIG. 2D, when the user commands the screen up, the VM screen switching apparatus may combine graphic data for a home screen of $VM_i$ currently displayed as a foreground with graphic data of a home screen $VM_{i+1}$ to create a synthesized screen. The VM screen switching apparatus may provide a gradually covering effect of the home screen of $VM_i$ with the home screen of $VM_{i+1}$ from down to up as indicated by 240 using the synthesized screen.

Figure 3:
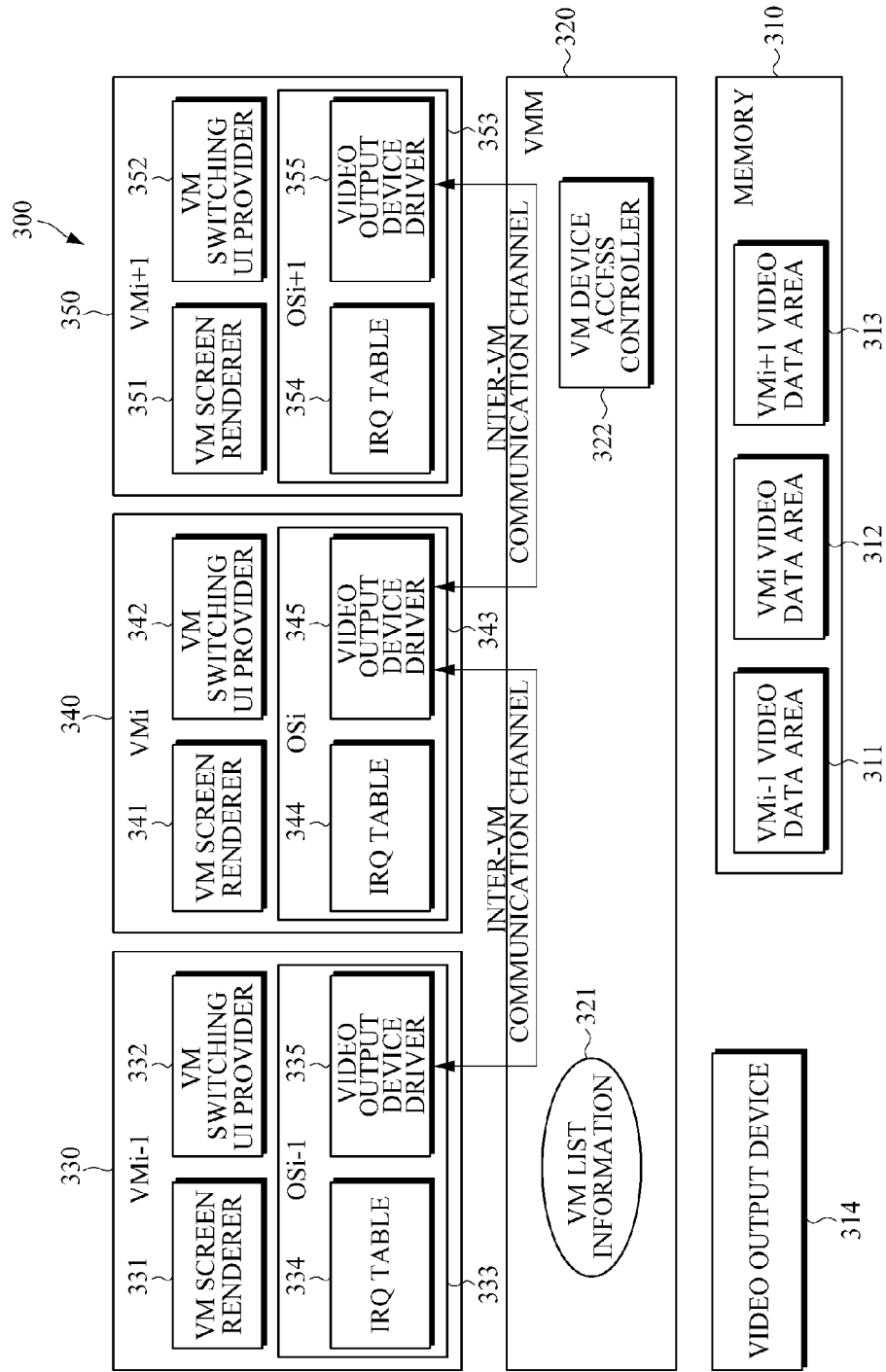
FIG. 3 is a diagram illustrating an example of a VM screen switching apparatus that provides the interface of FIG. 1.

Accordingly, a user may command the screen up, down, left, or right, and create a synthesized screen with a currently displayed VM screen and an adjacent VM screen FIG. 3 illustrates an example of a VM screen switching apparatus that provides the interface of FIG. 1.

Referring to FIG. 3, VM screen switching apparatus 300 includes a memory 310 and a video output device 314 belonging to a hardware layer. The VM screen switching apparatus 300 may include a variety of hardware, such as an HID for receiving various user inputs.

A virtual machine monitor 320 is included in a virtual machine monitor layer that supports a plurality of VMs 330, 340, and 350. The virtual machine monitor 320 maintains and manages VM list information 321 for VMs operating on the virtual machine monitor 320. The virtual machine monitor 320 may include a VM device access controller 322. When a VM is selected by a user, the VM device access controller 322 may set the selected VM as a foreground VM and set rights of accessing an HID and the video output device for the foreground VM.

In this example, the plurality of VMs includes a $VM_{i-1}$ 330, a $VM_i$ 340, and a $VM_{i+1}$ 350 operating on the virtual machine monitor 320. In this example, "i−1", "i", and "i+1" denote identifiers of the respective VMs. In this example, components $VM_{i-1}$ 330, $VM_i$ 340, and $VM_{i+1}$ 350 perform the same functions. Accordingly, for convenience only a configuration of the VM screen switching apparatus 300 is described in connection with $VM_i$ 340, and a further description of $VM_{i-1}$ 330 and $VM_{i+1}$ 350 is omitted for conciseness.

$VM_i$ 340 may include a VM screen renderer 341, a VM switching user interface (UI) provider 342, and OS, 343 for VM screen switching. OS, 343 may include an interrupt request (IRQ) table 344 and a video output device driver 345.

The VM switching UI provider 342 may provide a UI that enables a user to select a VM from the plurality of VMs, and determines a VM to be displayed as a foreground according to a user input signal. For example, when the user drags a mouse or drags on the home screen and slides a touch screen, tilts or waves the apparatus, or inputs voice, the VM switching UI provider 342 may recognize the action as a VM screen switching command.

A VM screen renderer 341 may combine screen data for a VM screen graphic interface currently displayed with screen data for a VM to be moved to and displayed according to a user input signal thus creating a screen switching effect.

The video output device driver 345 may access a video output device 314, such as a frame buffer, to show the rendering result from the VM screen renderer 341 on a screen of the video output device 314. The video output device driver 345 may also be used to display graphic data of $VM_i$ 340 on the screen. Although not shown, $VM_i$ 340 may further include an HID for receiving the user input signal, and an input device driver for processing an input signal from sensors, for example, a tilt sensor or a wave sensor.

The VM switching UI provider 342 may request and obtain the VM list information 321 from the virtual machine monitor 320 and use the VM list information 321 to determine a VM to be switched in response to a VM screen switching command. The VM list information 321 may include a list of operating VMs. In the VM list information 321 managed by the virtual machine monitor 320, the VMs may be aligned in an ascending order of values of identifiers of the VMs.

When the VM list information 321 is changed, the virtual machine monitor 320 may notify the VM switching UI provider 342 that the VM list information 321 has been updated.

For example, the VM list information 321 update may be performed by $VM_i$ 340 that is allocated a virtual IRQ for the VM list information 321 update from the virtual machine monitor 320 and may register a callback function for VM list information 321 update in the IRQ table 344 for the virtual IRQ. In some embodiments, the VM list information 321 update may be performed by a control VM that manages a life cycle of general VMs via an inter-VM communication channel provided by the virtual machine monitor 320. The control VM may be one of the plurality of VMs and may be set previously.

When a VM currently operating in the foreground is $VM_i$ 340, the VM screen renderer 341 may access a $VM_{i-1}$ video data area 311 and a $VM_{i+1}$ video data area 313 on a memory having screen graphic data for $VM_{i-1}$ 330 and $VM_{i+1}$ 350, and obtain graphic data to create a screen switching effect. The VM screen renderer 341 may request and obtain a configuration value of video output device driver of each VM and physical address information of the video data areas 311 and 313 of the memory 310 via an inter-VM communication channel provided by the virtual machine monitor 320.

If the video output device 314 supports layering or multiple planes, rendering through graphic data operation may not be performed in a program level. In this example, the video output device driver 345 may directly set a physical address of graphic data to be output to each plane of the video output device 314 and frame-buffer configuration information, and the video output device 314 may create the screen switching effect while adjusting the size of each plane and the image area to be displayed in the graphic data for the home screen of each VM.

When the video output device 314 does not support the layering or the multiple planes, the video output device driver 345 may map a home-screen graphic data area of the $VM_{i+1}$ video data area 313 of $VM_{i+1}$ 350 to a virtual address of $VM_i$ 340, such that the VM screen renderer 341 of $VM_i$ 340 can access graphic data necessary for rendering.

When the graphic data for the home screen of $VM_i$ 340 and the graphic data for the home screen of $VM_{i+1}$ 350 345 have the same output format, for example, the VM screen renderer 341 may create the screen switching effect while adjusting an image area to be displayed on the screen in the graphic data for the home screen of $VM_i$ 340 and the graphic data for the home screen of $VM_{i+1}$ 350. When the output formats of the graphic data set in the video output device driver 345 of $VM_i$ 340 and the video output device driver 355 of $VM_{i+1}$ 350 differ from each other, for example, the screen renderer 341 of $VM_i$ 340 may convert the output format of the graphic data for the home screen of $VM_{i+1}$ 350 into the output format used by the video output device driver 345 of $VM_i$ 340, store the resultant graphic data in a new memory area of $VM_i$ 340, and perform rendering for the screen switching effect.

FIG. 4 illustrates an example of a VM screen switching method.

Referring to FIG. 4, $VM_i$ 340 operates as a foreground VM. Referring to FIGS. 3 and 4, in operation 410 the VM switching UI provider 342 of $VM_i$ 340 fetches the VM list information 321 for operating VMs from the virtual machine monitor 320.

In operation 420, the VM screen renderer 341 may acquire configurations for a video output device 314 and physical addresses 311 and 313 of screen graphic data for video data from the video output device driver 335 of $VM_{i-1}$ 330 and the output device driver 355 of $VM_{i+1}$ 350, via the video output device driver 345.

In response to a screen request signal for $VM_{i+1}$ 350 being received via the user interface provided by the VM switching UI provider 342 in operation 430, in operation 440 the VM screen renderer 341 may create a screen switching effect using graphic data for the $VM_i$ screen and graphic data for the $VM_{i+1}$ screen.

In operation 450, the VM switching UI provider 342 may request the virtual machine monitor 320 to set the foreground VM to $VM_{i+1}$ 350. In operation 460, the virtual machine monitor 320 may switch the foreground VM to $VM_{i+1}$ 350 and may set rights of using all HIDs and the video output device for the $VM_{i+1}$ 350. Accordingly, in operation 470 the home screen of $VM_{i+1}$ 350 may be set to the foreground home screen.

Figure 5A:
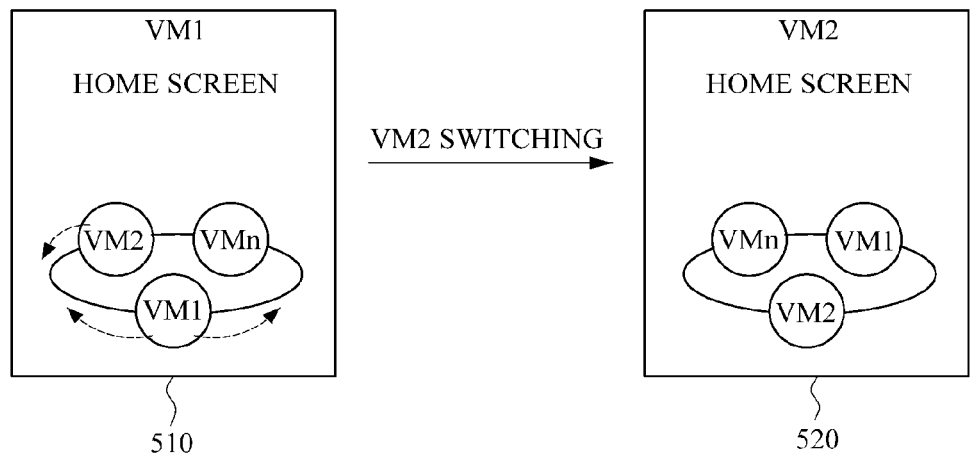
FIGS. 5A and 5B are diagrams illustrating another example of a VM screen switching interface.
Figure 5B:
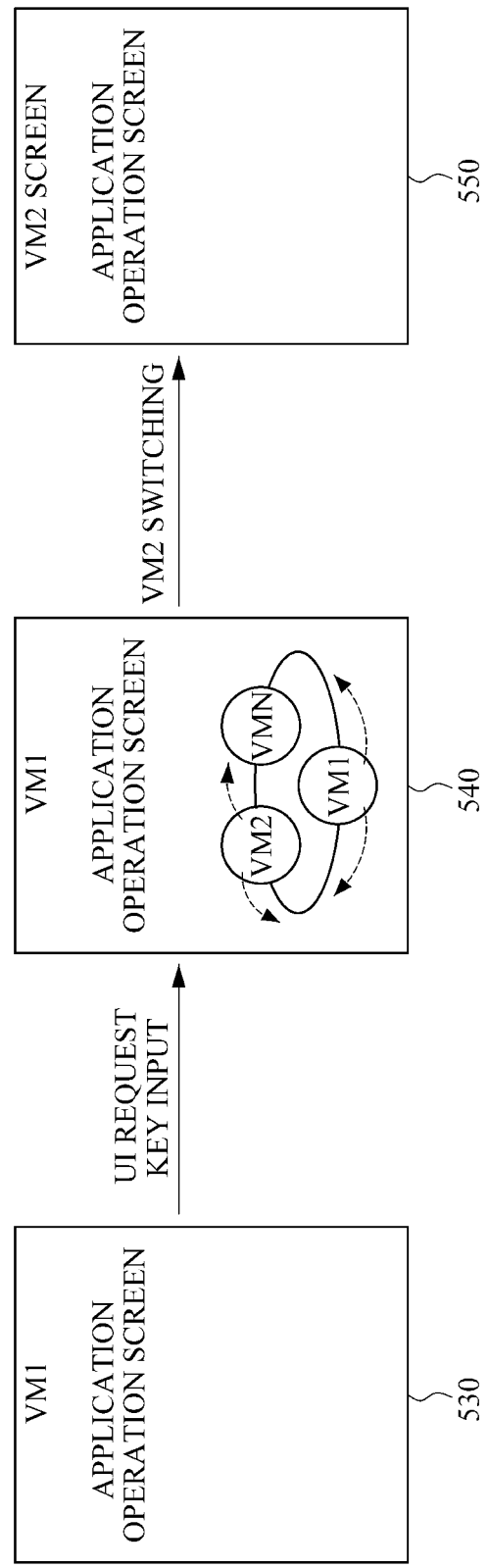

FIGS. 5A and 5B illustrate another example of the VM screen switching interface.

In FIGS. 5A and 5B, each VM is configured such that a foreground VM switching UI can be executed and a VM to be switched to can be selected from a VM list.

As shown in the screen 510, the VM list may be displayed, and a user interface may be provided through a program that provides a VM screen switching interface. The program providing the VM screen switching interface may be configured to operate in a Widget form on the home screen of each VM. Accordingly, the user may execute a VM screen switching program through a user input, for example, a specific key button input to request the VM screen switching interface, irrespective of a VM operating as the foreground VM. A list screen of a VM operating on a currently executed program may be provided in a pop-up window form.

In this example, the VM may be provided such that each VM is represented by a sphere moving along an oval axis in a lower portion of the home screen 510 of FIG. 5A. For example, a user may move the sphere to the left or right using a mouse or a touch screen. For example, a user may move the sphere corresponding to VM2 to a front location, as shown in the screen 520, by moving the spheres corresponding to the VMs to the left or right on the VM switching user interface.

Referring to FIG. 5B, in response to a user inputting a VM switching UI provision request key on an application operation screen 530 of VM1, a UI providing program may be provided in a Widget form on the VM1 application operation screen, as shown in the screen 540. When the user moves the spheres on the provided UI such that the sphere corresponding to VM2 is located at the front, and inputs a screen switching request, an operation screen for VM2 may be provided, as shown in a screen 550.

Accordingly, a user may view the operating VMs at a glance through the VM screen switching application. The user may execute a first VM and readily switch to an application of another VM while an application of the first VM is being executed.

Figure 6:
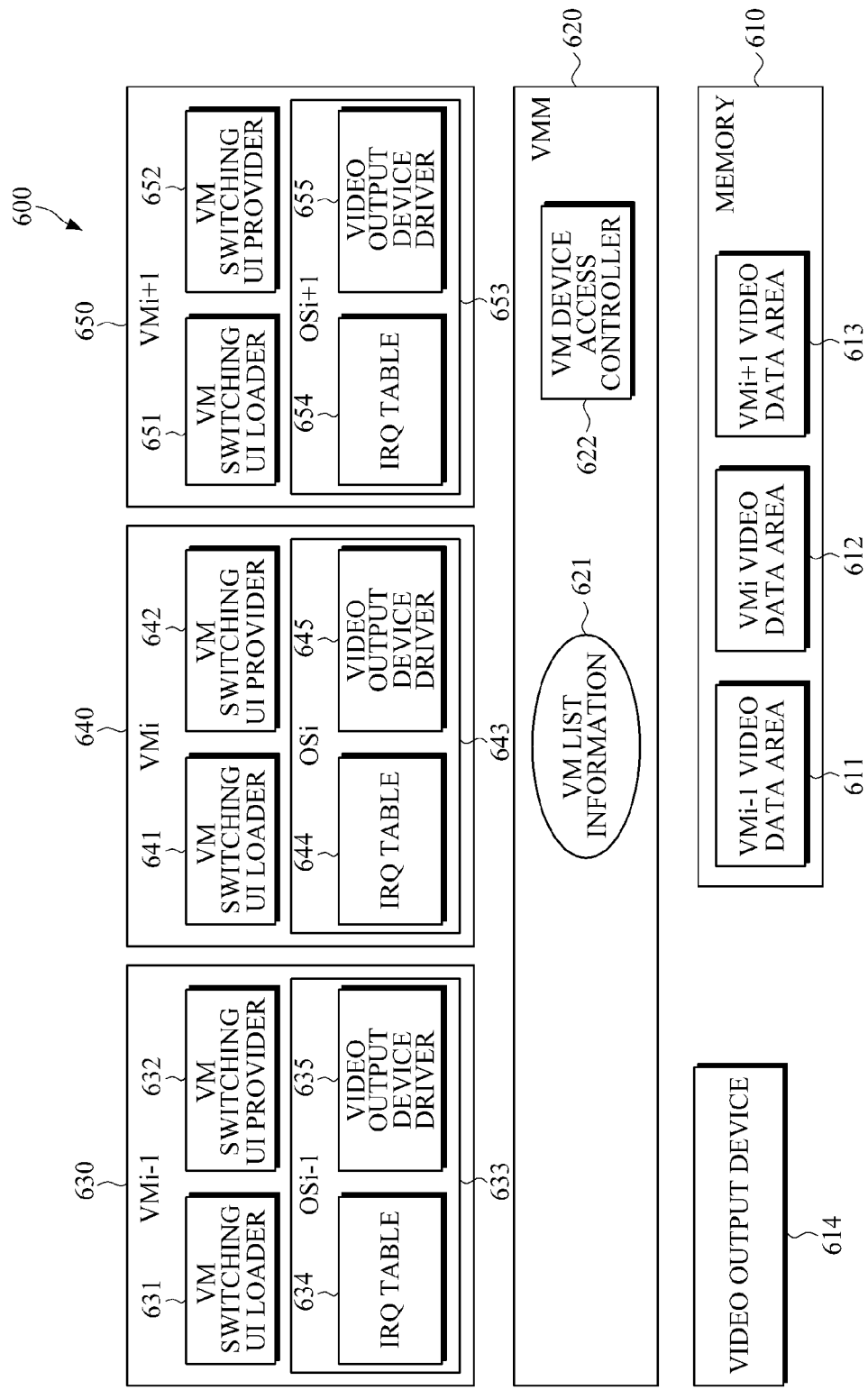
FIG. 6 is a diagram illustrating an example of a VM screen switching apparatus for providing the interface of FIGS. 5A and 5B.

FIG. 6 illustrates an example of a VM screen switching apparatus for providing the interface of FIGS. 5A and 5B.

Referring to FIG. 6, VM screen switching apparatus 600 may include a memory 610 and a video output device 614 included in a hardware layer. Although not shown, the VM screen switching apparatus 600 may include a variety of hardware, such as an HID for receiving various user inputs.

A virtual machine monitor 620 included in a virtual machine monitor layer may support a plurality of VMs 630, 640, and 650. The virtual machine monitor 620 may maintains and manage VM list information 621 for VMs operating on the virtual machine monitor 620. The virtual machine monitor 620 may include a VM device access controller 622. For example, if one VM is selected according to a setting or by the user, the VM device access controller 622 may set the selected VM as a foreground VM and set rights of accessing an HID and the video output device for the foreground VM.

The plurality of VMs, $VM_{i-1}$ 630, $VM_i$ 640, and $VM_{i+1}$ 650, may operate on the virtual machine monitor 620. In one example, $VM_{i-1}$ 630, $VM_i$ 640, and $VM_{i+1}$ 650 may have the same components, although embodiments are not limited thereto. Accordingly, for conciseness only a configuration of the VM screen switching apparatus 600 is described in connection with $VM_i$ 640.

$VM_i$ 640 may include a VM switching UI loader 641, a VM switching UI provider 642, and $OS_i$ 643; and $OS_i$ 643 may include an IRQ table 644 and a video output device driver 645. The virtual machine monitor 620 may include VM list information 621 and a VM device access controller 622, as described with reference to FIG. 3.

The VM switching UI loader 641 may recognize a switching input request input to a VM switching UI, for example, an input from a specific key by a user while a general application is operating, and may control the VM switching UI provider 642 to provide the VM switching UI on the screen.

The VM switching UI provider 642 may graphically display a VM list to the user and provide an interface for enabling the user to select a specific VM. For example, the VM switching UI may be executed in a pop-up form. When the VM list information 621 is fetched or changed, the VM switching UI provider 642 may be notified of the fact by the virtual machine monitor 620 or a control VM and update the notified information.

The IRQ table 644, the video output device driver 645, and the VM device access controller 622 perform the same functions as those shown in FIG. 3. Accordingly, a further description thereof is omitted.

FIG. 7 illustrates another example of a VM screen switching method.

In the example shown in FIG. 7, $VM_i$ 640 is operating as the foreground VM. Referring to FIGS. 6 and 7, in operation 710, in response to it being determined that a current screen is a home screen of $VM_i$ 640, the VM switching UI provider 642 may operate to execute the VM switching UI in operation 730. In response to it being determined, in operation 710, that the current screen is not the home screen of $VM_i$ 640, in operation 720 a determination may be made as to whether a user input is received to request VM switching UI execution. In response to the user input to request VM switching UI execution being received in operation 720, the VM switching UI provider 642 may operate to execute a foreground VM switching UI in operation 730. The "foreground VM switching UI" refers to a VM switching UI provided by a VM set as the foreground.

In operation 740, the VM switching UI provider 642 may provide the VM switching UI.

In response to, in operation 750, a user input signal being received to select another VM, in operation 760 the VM switching UI provider 642 may request the virtual machine monitor 620 to set the VM selected by the user as a foreground VM. In response to the request, in operation 770 the virtual machine monitor 620 may switch the VM selected by the user to the foreground VM and may set the rights of using the HIDs and the rights of using the video output device for the VM selected by the user. In operation 780, the foreground home screen may be switched to a home screen of the VM selected by the user. According to settings, an operation screen of an application currently operating in the foreground of the VM selected by the user may be provided in operation 780.

Figure 8B:
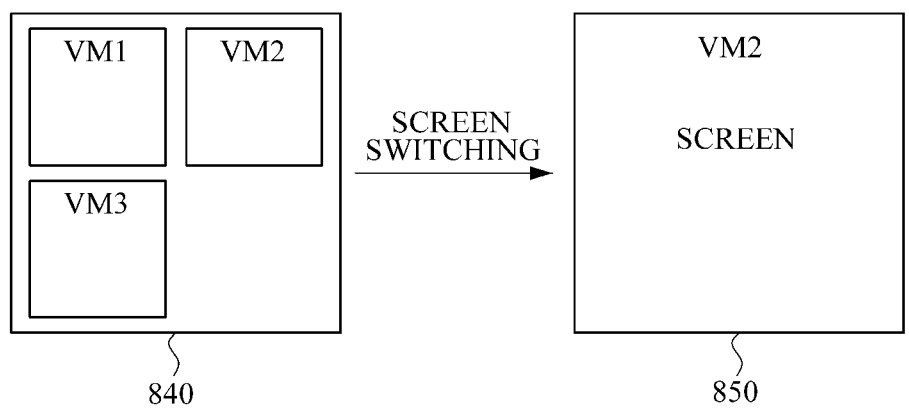

FIGS. 8A through 8C illustrate another example of a VM screen switching user interface.

FIGS. 8A through 8C illustrate a VM screen interface that displays contents of all the operating VMs on a screen of a VM screen switching apparatus. For example, only one of the VMs may execute a program for providing a VM screen switching UI and provide an interface for enabling a user to switch a screen between the VMs. For example, in response to the user's pressing a specific key button, the program for providing a VM switching UI may render current screen graphic data for all operating VMs on a single screen. The screen graphic data for the VMs may be displayed in various forms, for example, in an overlapped form as shown in FIG. 8A, in a grid form as shown in FIG. 8B, in a three-dimensional figure form as shown in FIG. 8C, and the like.

Referring to FIG. 8A, a screen 810 may provide overlapped VM screen images. In response to the user's selecting the screen image of VM2 located in the background, a VM2 screen may be displayed at the front, as shown in screen 820. In this example, when the user clicks the VM2 screen again or taps a touch screen to select the VM2 screen image, the selected VM2 screen may be displayed as shown in a screen 830. The displayed VM2 screen may be the home screen of VM2 or an application execution screen operating on VM2.

Referring to FIG. 8B, a screen 840 may provide VM screen images represented in a grid form. In response to the user's selecting an image, for example, the VM2 screen image of the VM screen images represented in a grid form on the screen 840, the selected VM2 screen may be displayed as shown in a screen 850.

Referring to FIG. 8C, a screen 860 may provide VM screen images in a three-dimensional figure. In response to the user's inputting commands to rotate the three-dimensional figure, one of the VM screen images selected by the user may be provided on the front side of the three-dimensional figure. For example, if the screen image of VM2 is provided on the front side of the three-dimensional figure, as shown in a screen 870, and a user clicks or taps on the screen 870, the VM2 screen may be displayed as shown in screen 880.

According to various embodiments, the VM screen switching UI providing application may enable the user to view various VM(s) at a glance. The UI may enable convenient movement to a desired VM, and may allow for an application of a current VM to readily be switched to an application of another VM while an application of the current VM is being executed. Also, a user may view currently displayed information of all the VM screens at a glance.

The user may input various commands via various input devices, such as a keyboard, keypad, touch screen, mouse, stylus, microphone, and the like. A user may manipulate the VM screen switching UI providing application such that the user can see the various VMs executable by the device.

Figure 9:
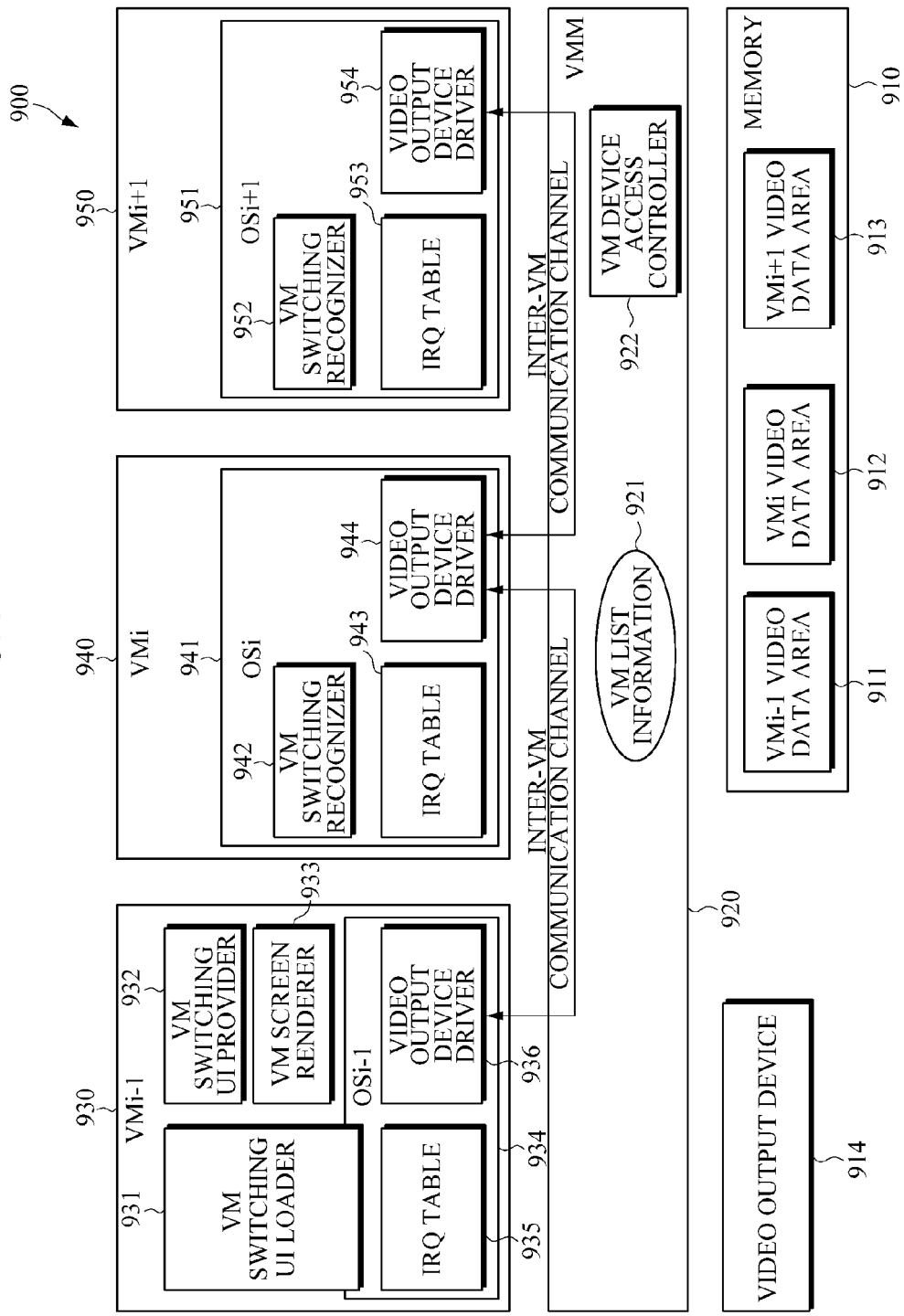
FIG. 9 is a diagram illustrating an example of a VM screen switching apparatus for providing the interface of FIGS. 8A through 8C.

FIG. 9 illustrates an example of a VM screen switching apparatus for providing the interface of FIGS. 8A through 8C.

Referring to FIG. 9, VM screen switching apparatus 900 may include a memory 910 and a video output device 914 included in a hardware layer. Although not shown, the VM screen switching apparatus 900 may include a variety of hardware, such as an HID for receiving various user inputs.

A virtual machine monitor 920 included in a virtual machine monitor layer may support a plurality of VMs 930, 940, and 950. The virtual machine monitor 920 maintains and manages a VM information list 921 for VMs operating on the virtual machine monitor 920. The virtual machine monitor 920 may include a VM device access controller 922. For example, when one of the VMs is selected according to a setting or by a user, a VM device access controller 922 may set the selected VM as a foreground VM and set rights of accessing an HID and a video output device for the foreground VM.

The plurality of VMs 930, 940, and 950 include IRQ tables 936, 943, and 953 and video output device drivers 936, 944, and 954, respectively. For VM screen switching according to various embodiments, only one VM 930 of the plurality of VMs 930, 940, and 950 may include a VM switching UI loader 931, a VM switching UI provider 932, and a VM screen renderer 933, and the other VMs 940 and 950 may include VM switching recognizers 942 and 952, respectively. The VM 930 providing a VM switching UI may be a server VM and the other VMs 940 and 950 may be client VMs.

In this example, $VM_i$ 940 is currently operating as a foreground VM. The VM switching recognizer 942 recognizes if the user requests to execute a VM switching UI by pressing a specific key button. In response to the request, the VM switching recognizer 942 may request the virtual machine monitor 920 to switch $VM_{i-1}$ 930 to a foreground and execute the VM switching UI provider 932. The VM switching recognizer 942 may inform the VM switching UI loader 931 of user request information requesting VM switching via an inter-VM communication channel provided by the virtual machine monitor 920.

The VM switching UI loader 931 of $VM_{i-1}$ 930 may determine whether the $VM_{i-1}$ 930 has been switched to the foreground VM based on the VM switching UI request made by another VM (e.g., $VM_i$), so that the VM switching UI provider 932 may be executed. In response to a specific key button being pressed while a general application is being executed in $VM_{i-1}$ 930, the VM switching UI loader 931 may recognize a VM switching UI execution request and may enable execution of the VM switching UI or switching to a foreground application.

The VM switching UI provider 932 may graphically display data for a VM operating on the virtual machine monitor, and provide a VM switching user interface for enabling the user to select a specific VM. The VM switching UI provider 932 may obtain the VM list information 921 from the virtual machine monitor 920.

The VM screen renderer 933 may obtain an address of a VM video data area on the memory 910 of each VM under control of the VM switching UI provider 932. The address of each VM video data area may be obtained via the inter-VM communication channel between the video output device driver. The VM screen renderer 933 may access the obtained address and create a screen providing a screen in various forms, e.g., each VM may be displayed in an overlapped form, a grid form, or a three-dimensional figure form using video data information of each VM. The VM screen renderer 933 may generate a screen displaying VMs according to a user input.

In displaying a screen image of each VM, when the video output device 914 supports layering or multiple planes, the video output device driver 936 may directly set a memory address to be output to each plane of the video output device 914 and directly render graphic data through an image size change, without the VM screen renderer 933 rendering graphic data of a VM to be switched through operation of the graphic data in a program level, as in the switching effect of the interface of FIG. 1.

Figure 10:
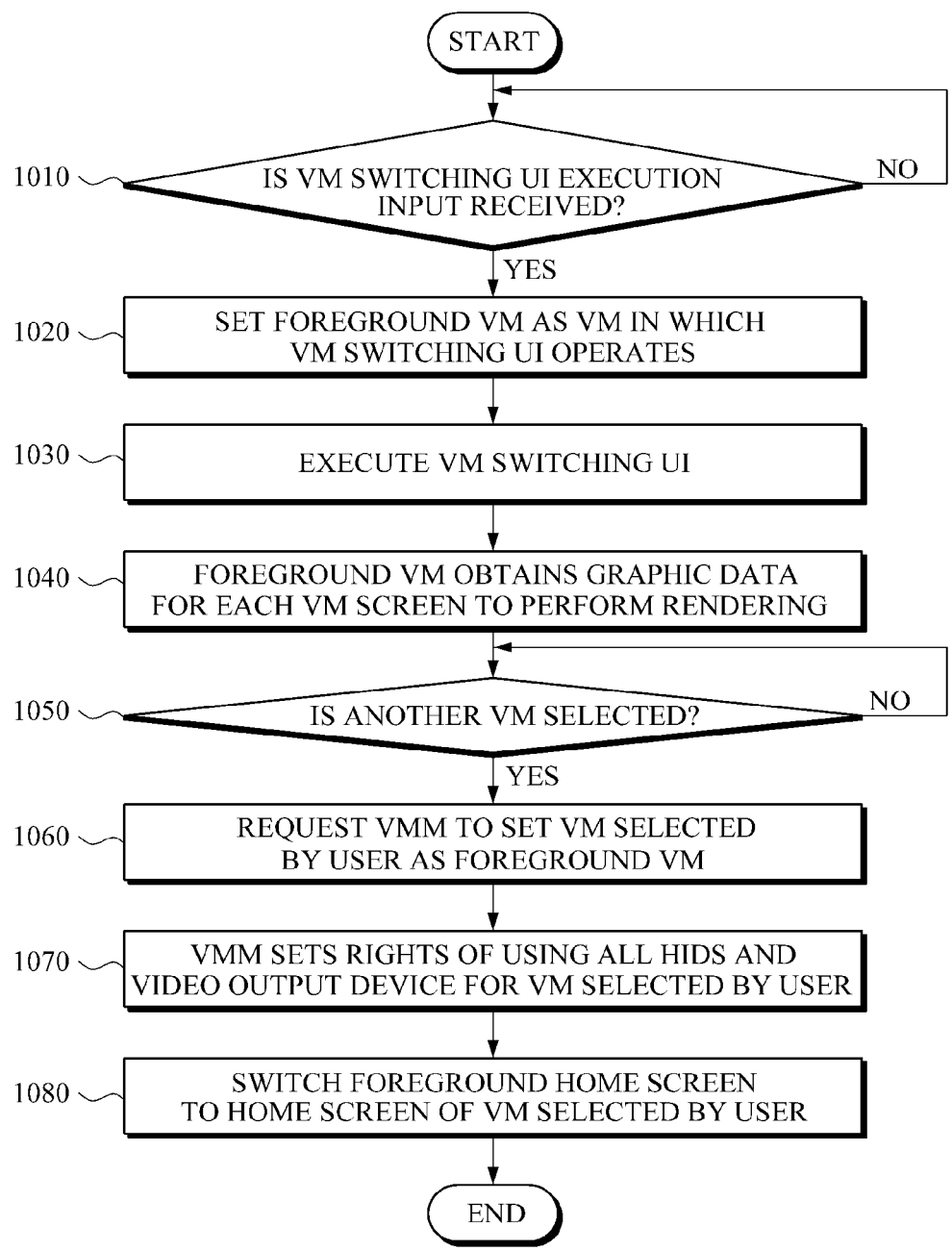
FIG. 10 is a flowchart illustrating another example of a VM screen switching method 8A through 8C.

FIG. 10 illustrates another example of a VM screen switching method.

Referring to FIGS. 9 and 10, in response to $VM_i$ 940 or $VM_{i+1}$ 950 being set as the foreground VM and the user's requesting VM switching UI execution through a specific key input in operation 1010, the virtual machine monitor 920 may set the foreground VM as $VM_{i-1}$ 930 in which the VM switching UI operates in operation 1020. In operation 1030, the VM switching UI provider 932 may obtain the VM list information 921 from the virtual machine monitor 920 and may use the VM list information 921 to execute the VM switching UI. In operation 1040, the VM screen renderer 934 of the foreground VM, e.g., $VM_{i-1}$ 930, may obtain graphic data for each VM screen to perform rendering. The rendered result may be provided to the video output device 914 via the video output device driver 936.

In response to a user input being received in operation 1050 to select another VM (e.g., $VM_{i+1}$ 950), in operation 1060 the VM switching UI provider 932 may request the virtual machine monitor 920 to set the VM selected by the user as a foreground VM. In operation 1070, the virtual machine monitor 920 may set the rights of using the HIDs and the rights of using the video output device for the VM selected by the user. In operation 1080, the foreground home screen may be switched to the home screen of the VM selected by the user.

Accordingly, the VM screen switching apparatus supporting a plurality of VMs may provide a unique screen of each operating VM to the user. Also, the entire area of the screen may be used, thus, the apparatus may be usefully applied to CE devices having a screen that is smaller than the screen of a PC.

Also, screen display graphic data for the selected VM may be accessed when another VM is selected using the VM switching user interface. After the selected VM is set as the foreground VM, the video output device may be directly accessed by the video output device driver of the foreground VM, reducing overhead.

Figure 11:
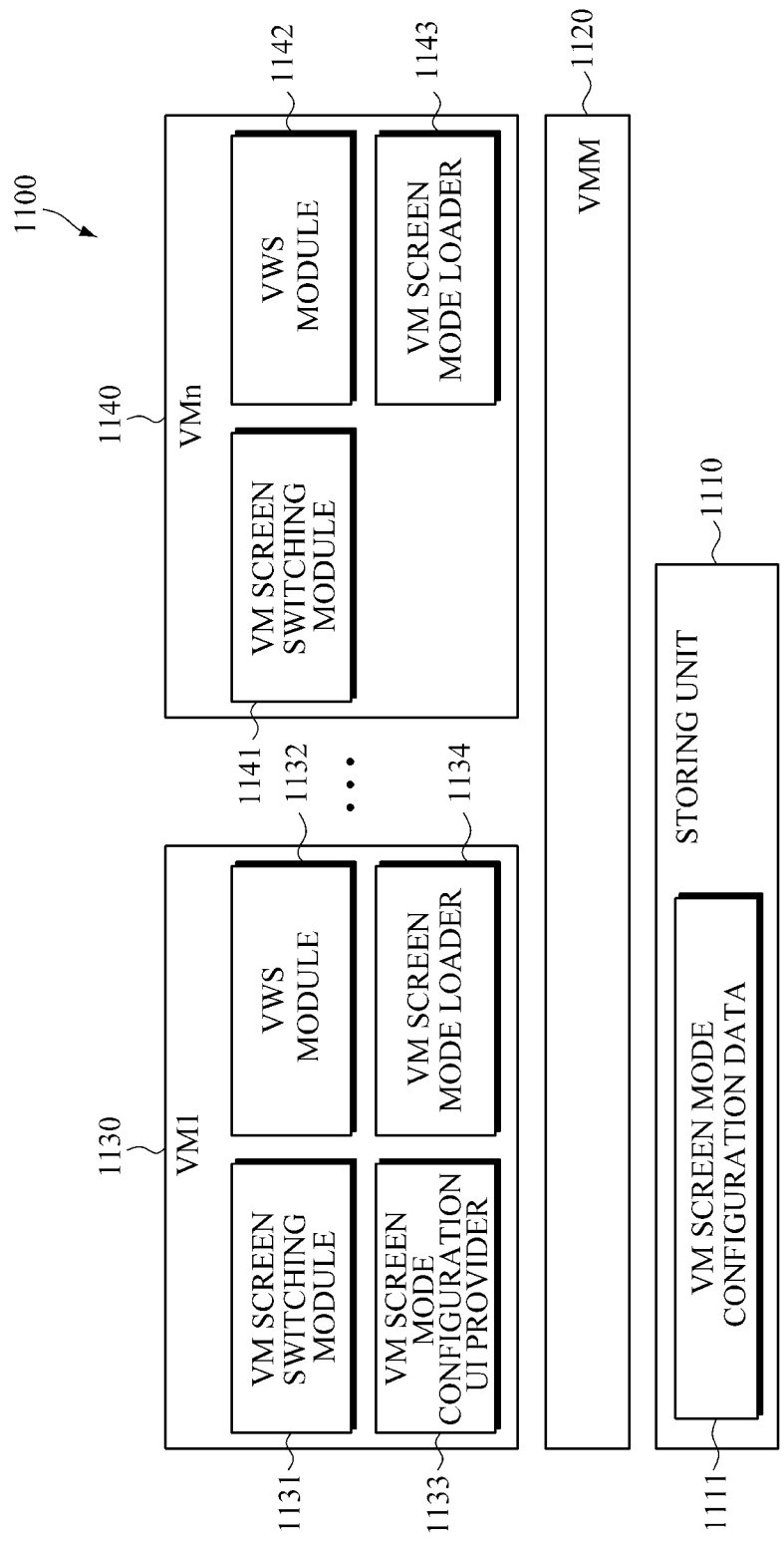
FIG. 11 is a diagram illustrating an example of a screen switching apparatus for additionally providing a virtual window system mode.

FIG. 11 illustrates an example of a screen switching apparatus for additionally providing a virtual window system mode.

Referring to FIG. 11, the screen switching apparatus may include a module for switching a screen between VMs and a module for providing a virtual window system mode.

The VM screen switching user interface described with reference to FIGS. 1 to 10 may provide the home screen or the operation screen on each VM to the user. Accordingly, the user may readily verify an operable application using the home screen of each VM, or readily verify the operation screen of an executed application. On the other hand, the user may execute, terminate, and manage applications without needing to know which VM an application belongs to or which VM on which an application is executed by, through the user interface according to the virtual window system mode. For example, the virtual window system mode may provide an integrated user interface using icons for a plurality of applications operating in the plurality of VMs 1130 and 1140.

The VM screen switching apparatus 1100 may perform an operation according to the virtual window system mode, and the plurality of VMs 1130 and 1140 may operate in the virtual window system mode. In the virtual window system mode, a plurality of applications operating in the plurality of VMs 1130 and 1140 are selectively integrated and provided without discriminating the plurality of VMs.

Referring to FIG. 11, a VM screen switching apparatus 1100 may include a storing unit 1110 included in a hardware layer. Although not shown, the VM screen switching apparatus 1100 may include a variety of hardware, such as a video output device for displaying video output information and an HID for receiving various user inputs. The VM screen switching apparatus 1100 may set VM screen mode configuration data 1111 indicating a mode in which the VM screen operates, and store the VM screen mode configuration data 1111 in the storing unit 1110.

The virtual machine monitor 1120 may be included in a virtual machine monitor layer that supports a plurality of VMs 1130 and 1140. In each of the VMs 1130 and 1140, VM screen switching modules 1131 and 1142 may be configured for VM screen switching using a variety of interfaces described above.

In each of the VMs 1130 and 1140, a virtual window system module 1132 may display each VM application on a single screen, and may provide a virtual window system (VWS) that may be executed and managed.

A VM screen mode configuration UI provider 1133 of VM1 1130 may provide an interface that enables a user to select a VM screen switching mode or a VWS mode, and may store a user-set result as the VM screen mode configuration data 1111. The VM screen mode configuration UI provider 1133 may operate in a previously set VM 1130 of the plurality of VMs 1130 and 1140.

In the VMs 1130 and 1140, VM screen mode loaders 1134 and 1143 may load data or modules stored in the storing unit 1110 to the VMs 1130 and 1140 according to a VM screen switching mode or a virtual window system mode. In the example of FIG. 11, the VM screen switching modules 1131 and 1141 and the virtual window system modules 1132 and 1142 may be all loaded to the VMs 1130 and 1140. However, it should be appreciated that the VM screen switching modules 1131 and 1141 and the virtual window system modules 1132 and 1142 may be selectively loaded to the VMs 1130 and 1140 according to a setting of the VM screen mode configuration data 1111.

Each of the VM screen mode loaders 1134 and 1143 may access the VM screen mode configuration data 1111 stored by the VM screen mode configuration UI provider 1133 to determine a currently set mode and to execute modules necessary for each mode. In response to a specific mode being executed and a mode setting being changed, the VM screen mode loaders 1134 and 1143 may inactivate modules for the currently executed mode and execute modules for the switched mode.

Accordingly, a user may operate the apparatus supporting a plurality of VMs, by using the VM screen switching user interface in the apparatus or by using the user interface that integrates and provides information on executed applications without discriminating the operating VMs.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A virtual machine (VM) screen switching apparatus, the apparatus comprising:
 a virtual machine monitor; and
 a plurality of VMs, each VM comprising:
  a VM switching user interface provider configured to provide a user interface for enabling a user to select a next VM from among the plurality of VMs, and to determine to display the next VM as a foreground, according to a user input signal;
  a VM screen renderer configured to combine graphic data of a current VM being displayed as the foreground with graphic data of the next VM to be displayed, and to create a screen displaying VM screen switching including the combined graphic data including a screen of the current VM and a screen of the next VM each partially shown on a display and being slidable together on the display by a user action; and
  an output device driver configured to output the created screen to the display.

2. The apparatus of claim 1, wherein:
 each VM further comprises a storing unit configured to store graphic data of VM screens of the plurality of VMs; and
 the VM screen renderer is further configured to obtain a physical address of the storing unit at which the graphic data of the screen of the next VM is stored through communication between the output device driver and an output device driver of the determined VM.

3. The apparatus of claim 1, wherein the user input signal comprises at least one of a voice input, an input from a sensor sensing the tilt of the VM screen switching apparatus, an input from a sensor sensing the wave of the VM screen switching apparatus, a mouse input, and a touch screen input.

4. The apparatus of claim 1, wherein the VM screen comprises a home screen comprising information on a plurality of applications executable by the current VM.

5. The apparatus of claim 1, wherein the virtual machine monitor is further configured to:
manage a list of at least one operating VM; and
provide an updated list to the VM switching user interface provider when the list is updated.

6. The apparatus of claim 1, wherein the virtual machine monitor is further configured to adjust a setting so that the next VM determined according to the user input signal has a right to access a user input device for receiving the user input signal and the display device.

7. The apparatus of claim 1, wherein each of the plurality of VMs is configured to operate in a virtual window system mode in which a plurality of applications operating in the plurality of VMs are integrated and provided without discriminating the plurality of VMs.

8. A virtual machine (VM) screen switching apparatus, the apparatus comprising:
a virtual machine monitor; and
a plurality of VMs, each VM comprising:
a VM switching user interface provider configured to graphically display a plurality of icons corresponding to a plurality of VMs operating on the virtual machine monitor, and to provide a user interface that enables a user to select an icon, and to enable a user to simultaneously move a position of the plurality of icons corresponding to the plurality of VMs by selecting a single icon and moving the single icon; and
a video output device driver configured to output the user interface to a display device.

9. The apparatus of claim 8, wherein each of the plurality of VMs further comprises a VM switching UI loader configured to:
recognize a user input signal requesting a user interface while a general application is operating; and
control the VM switching user interface provider to provide the user interface.

10. The apparatus of claim 8, wherein the VM switching user interface provider is further configured to provide the user interface in a pop-up form.

11. The apparatus of claim 8, wherein the VM switching user interface provider is further configured to provide the user interface in a Widget form from which the operating VMs may be selected.

12. The apparatus of claim 11, wherein:
the virtual machine monitor is further configured to switch the selected VM to a foreground VM according to a user input signal to select the specific VM from the plurality of VMs, the user input signal being provided via the user interface; and
an output device driver included in the switched VM is configured to output an operation screen of the switched VM to the display device.

13. The apparatus of claim 8, wherein:
the virtual machine monitor is further configured to manage a list of at least one operating VM; and
in response to the list of at least one operating VM being updated, the virtual machine monitor is further configured to provide the updated list to the VM switching user interface provider.

14. The apparatus of claim 8, wherein each of the plurality of VMs is configured to operate in a virtual window system mode in which a plurality of applications operating in the plurality of VMs are integrated and provided without discriminating the plurality of VMs.

15. A virtual machine (VM) screen switching apparatus, the apparatus comprising:
a virtual machine monitor; and
a plurality of VMs comprising:
a client VM configured to receive a request to provide a user interface, and in response, configured to request the virtual machine monitor to switch a next VM to a foreground and execute the next VM; and
a server VM configured to combine graphic data for the client VM and the next VM operating on the virtual machine monitor, to graphically display the combined graphic data including a screen of the current VM and a screen of the next VM each partially shown on a display and being slidable together on the display by a user action, and to provide a user interface configured to enable a user to select the next VM from the plurality of VMs, in response to the request to provide a user interface.

16. The apparatus of claim 15, wherein the server VM comprises:
a VM switching user interface provider configured to graphically display the graphic data for the VMs operating on the virtual machine monitor, and to provide the user interface;
a VM switching UI loader configured to recognize the request to provide a user interface, and to control the VM switching user interface provider to provide the user interface; and
a video output device driver configured to output the user interface to a display device,
wherein the client VM comprises a VM switching recognizer configured to recognize whether the user requests to execute a VM switching user interface in response to the client VM operating as a foreground.

17. The apparatus of claim 16, wherein the server VM further comprises a VM screen renderer configured to create a screen displaying VM screen switching according to a user input signal input via the user interface.

18. The apparatus of claim 16, wherein the VM switching user interface provider is further configured to control the VM screen renderer such that the user interface displays graphic data for screens of the plurality of VMs in at least one of an overlapped form, a grid form, and a three-dimensional figure form.

19. The apparatus of claim 15, wherein each of the plurality of VMs is configured to operate in a virtual window system mode in which a plurality of applications operating in the plurality of VMs are integrated and provided without discriminating the plurality of VMs.

20. A virtual machine (VM) screen switching method, the method comprising:
receiving a signal requesting a VM switching user interface;
combining graphic data of a current VM being displayed as the foreground with graphic data of the next VM to be displayed;
creating a screen displaying VM screen switching including the combined graphic data including a screen of the current VM and a screen of the next VM each partially shown on a display and being slidable together on the display by a user action; and
outputting the created screen.

* * * * *